(12) United States Patent
Yamazaki

(10) Patent No.: US 12,623,681 B2
(45) Date of Patent: May 12, 2026

(54) DRIVING ASSISTANCE DEVICE, METHOD, AND COMPUTER- READABLE NON-VOLATILE STORAGE MEDIUM

(71) Applicant: HONDA MOTOR CO., LTD., Tokyo (JP)

(72) Inventor: Taku Yamazaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 18/891,886

(22) Filed: Sep. 20, 2024

(65) Prior Publication Data

US 2025/0108825 A1 Apr. 3, 2025

(30) Foreign Application Priority Data

Sep. 29, 2023 (JP) ................................. 2023-170826

(51) Int. Cl.
*B60W 50/14* (2020.01)
*B60W 30/095* (2012.01)
*H04W 4/46* (2018.01)
(52) U.S. Cl.
CPC .......... *B60W 50/14* (2013.01); *B60W 30/095* (2013.01); *H04W 4/46* (2018.02); *B60W 2520/10* (2013.01); *B60W 2540/10* (2013.01)
(58) Field of Classification Search
CPC ............... B60W 50/14; B60W 30/095; B60W 2520/10; B60W 2540/10; B60W 2556/65; H04W 4/46
See application file for complete search history.

(56) References Cited

U.S. PATENT DOCUMENTS 1,100,804 A 6/1914 White
7,002,452 B2 2/2006 Watanabe et al.
(Continued)

FOREIGN PATENT DOCUMENTS

JP 2002-163796 A 6/2002
JP 2010250600 A 11/2010
(Continued)

OTHER PUBLICATIONS

Japanese Office Action for Japanese Patent Application No. 2023-170826 mailed on Sep. 29, 2025.
(Continued)

*Primary Examiner* — An T Nguyen
(74) *Attorney, Agent, or Firm* — THOMAS | HORSTEMEYER, LLP

(57) ABSTRACT

A driving assistance device, which is to be mounted on a vehicle capable of communicating with another vehicle, comprises a calculation unit configured to calculate a travel route of the another vehicle based on a communication result with the another vehicle, an arithmetic processing unit configured to determine whether the self-vehicle will interfere with the another vehicle traveling on the travel route calculated, and to generate a notification signal for giving a notification that the self-vehicle will interfere with the another vehicle, upon determination that the self-vehicle will interfere with the another vehicle, and an identification unit configured to identify a state of a shift range of the self-vehicle, wherein in a case where the shift range identified by the identification unit suppresses a movement of the self-vehicle, the arithmetic processing unit is deactivated.

12 Claims, 8 Drawing Sheets

(56) References Cited

U.S. PATENT DOCUMENTS

| | | | |
|---|---|---|---|
| 10,579,884 B2 | 3/2020 | Kiyo et al. | |
| 10,933,890 B2 | 3/2021 | Aoki | |
| 11,042,996 B2 | 6/2021 | Yokoyama et al. | |
| 11,760,345 B2 | 9/2023 | Kozono et al. | |
| 2022/0105927 A1 | 4/2022 | Kozono et al. | |
| 2022/0297687 A1 | 9/2022 | Yamazaki | |
| 2022/0340129 A1 * | 10/2022 | Zhou ............... | B60W 30/18054 |

FOREIGN PATENT DOCUMENTS

| | | | | |
|---|---|---|---|---|
| JP | 2014241115 A | 12/2014 | | |
| JP | 2016218795 A | 12/2016 | | |
| JP | 2018095067 A | 6/2018 | | |
| JP | 2019-159975 A | 9/2019 | | |
| JP | 2020123155 A | 8/2020 | | |
| JP | 2022-061482 A | 4/2022 | | |
| JP | 2022145240 A | 10/2022 | | |
| WO | WO-2019012629 A1 * | 1/2019 | ............ | H04W 4/024 |

OTHER PUBLICATIONS

Japanese Office Action for Japanese Patent Application No. 2023-170826 mailed on May 9, 2025.

* cited by examiner

Figure 1:
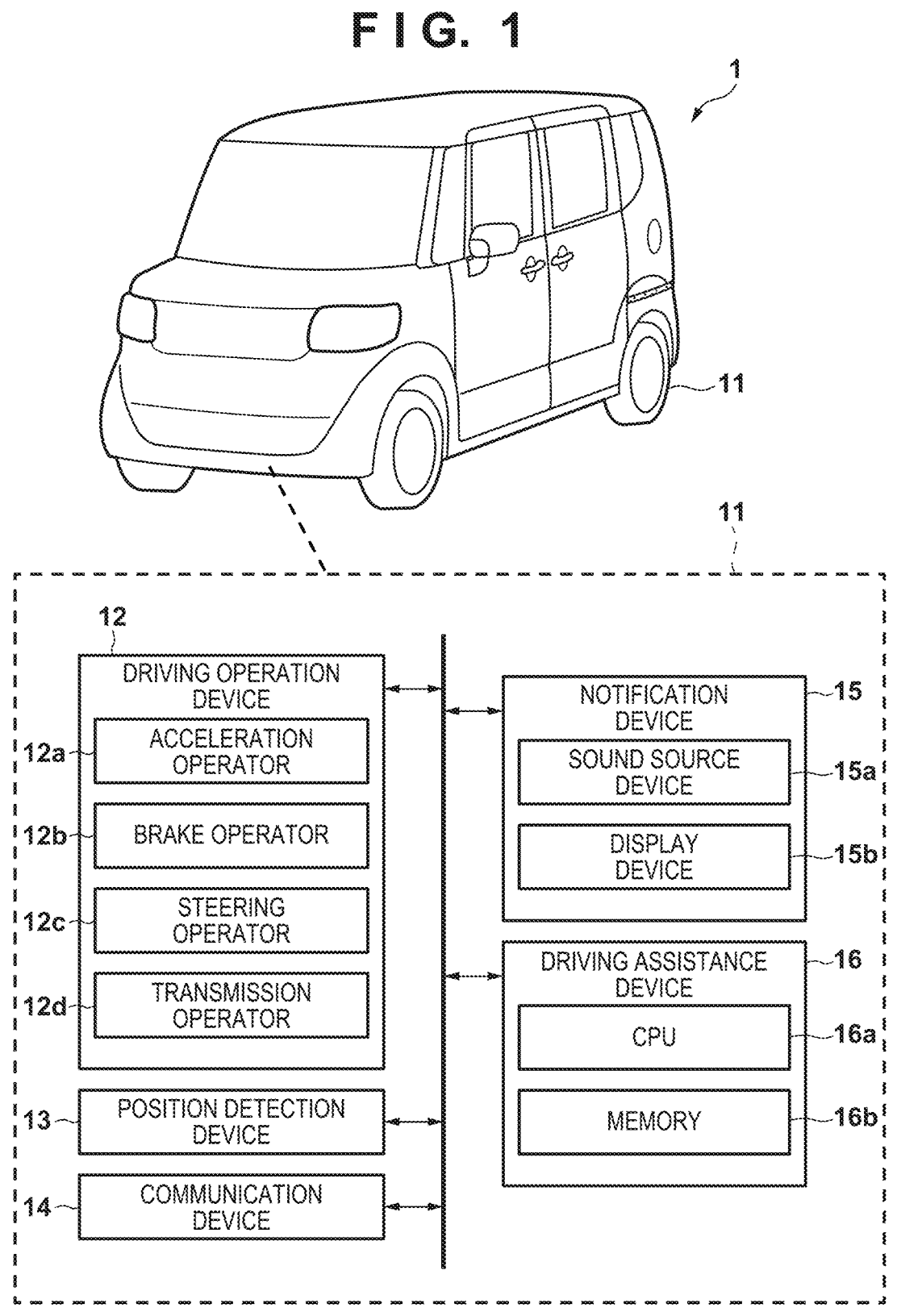

12 DRIVING OPERATION DEVICE

12a ACCELERATION OPERATOR

12b BRAKE OPERATOR

12c STEERING OPERATOR

12d TRANSMISSION OPERATOR

13 POSITION DETECTION DEVICE

14 COMMUNICATION DEVICE

NOTIFICATION DEVICE — 15

SOUND SOURCE DEVICE — 15a

DISPLAY DEVICE — 15b

DRIVING ASSISTANCE DEVICE — 16

CPU — 16a

MEMORY — 16b

F I G. 4
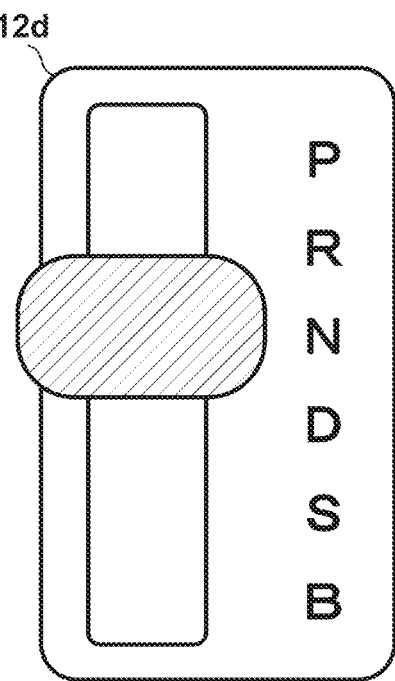

F I G. 6
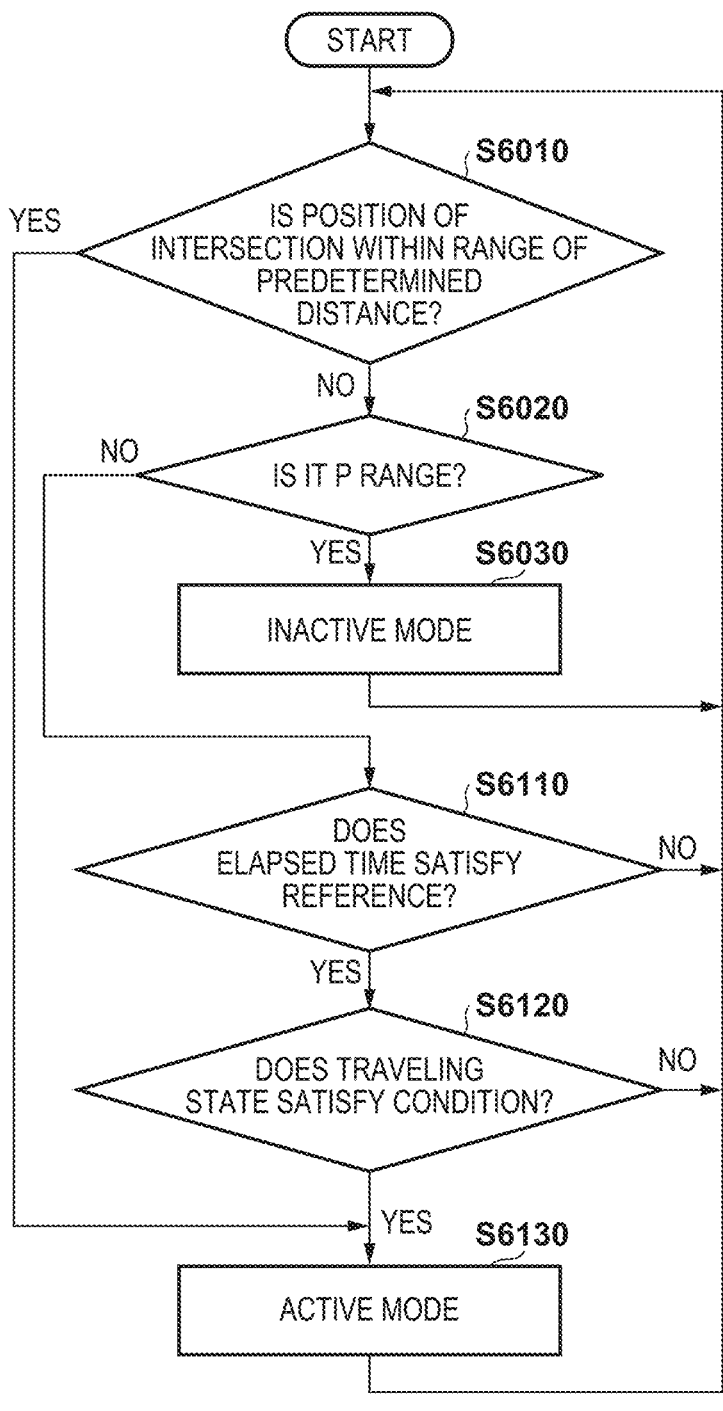

DRIVING ASSISTANCE DEVICE, METHOD, AND COMPUTER- READABLE NON-VOLATILE STORAGE MEDIUM

CROSS-REFERENCE TO RELATED APPLICATION(S)

This application claims priority to and the benefit of Japanese Patent Application No. 2023-170826, filed Sep. 29, 2023, the entire disclosure of which is incorporated herein by reference.

BACKGROUND OF THE INVENTION

Field of the Invention

The present invention mainly relates to a driving assistance device to be mounted on a vehicle.

Description of the Related Art

These days, efforts are actively made to provide access to a sustainable transportation system that also gives consideration to people in vulnerable situations among traffic participants. In order to achieve such a transportation system, research and development of preventive safety technology are widely proceeded to further improve traffic safety and convenience.

Some vehicles perform vehicle-to-vehicle communication of communicating with other vehicles, and thus enable driving assistance (see Japanese Patent Laid-Open No. 2022-61482), and in general, there may be a demand for further improving the preventive safety technology that can be utilized for the driving assistance.

SUMMARY OF THE INVENTION

The present invention provides a technique advantageous for further improving preventive safety technology that can be utilized for driving assistance.

One of the aspects of the present invention provides a driving assistance device to be mounted on a vehicle capable of communicating with another vehicle, the driving assistance device comprising: a calculation unit configured to calculate a travel route of the another vehicle, based on a communication result with the another vehicle; an arithmetic processing unit configured to determine whether the self-vehicle will interfere with the another vehicle traveling on the travel route calculated, and to generate a notification signal for giving a notification that the self-vehicle will interfere with the another vehicle, upon determination that the self-vehicle will interfere with the another vehicle; and an identification unit configured to identify a state of a shift range of the self-vehicle, wherein in a case where the shift range identified by the identification unit suppresses a movement of the self-vehicle, the arithmetic processing unit is deactivated.

Further features of the present invention will become apparent from the following description of exemplary embodiments (with reference to the attached drawings).

BRIEF DESCRIPTION OF THE DRAWINGS

FIG. 1 is a diagram illustrating a system configuration example of a vehicle according to an embodiment;

FIG. 4 is a diagram illustrating a typical example of a shift range of a vehicle;

FIG. 6 is a flowchart illustrating control contents of a driving assistance device.

DESCRIPTION OF THE EMBODIMENTS

Figure 2A:
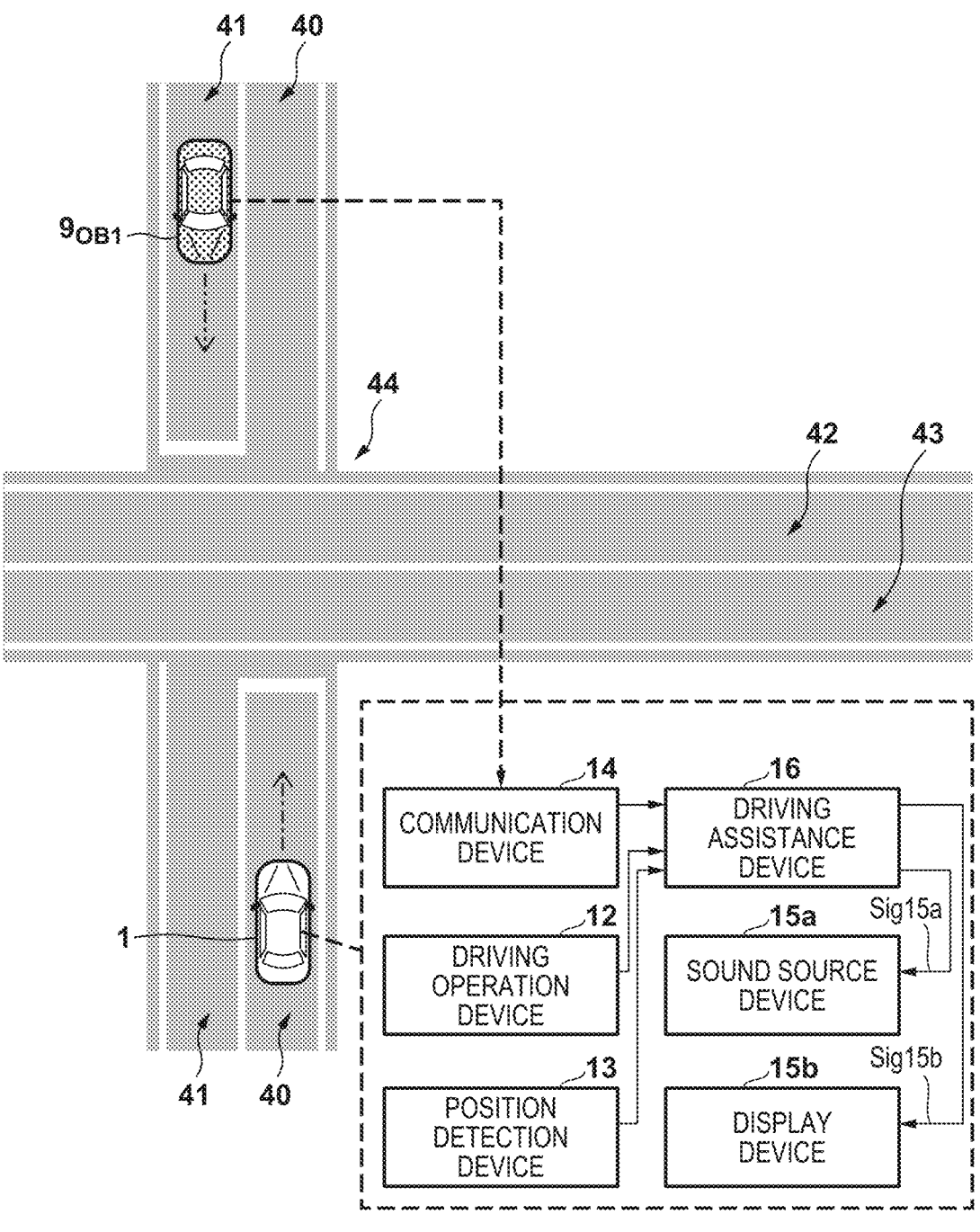
FIG. 2A is a diagram for describing driving assistance in one mode.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(System Configuration Example of Vehicle)

FIG. 1 illustrates a vehicle 1 according to an embodiment. The vehicle 1 is a four-wheeled vehicle including two front wheels and two rear wheels as wheels 11, but the number of the wheels 11 is not limited to this example, and may be, for example, a two-wheeled vehicle or a three-wheeled vehicle. In addition, the vehicle 1 is a boarding type of vehicle in the present embodiment, but may be a straddle type vehicle in another embodiment.

In the present embodiment, the vehicle 1 further includes a driving operation device 12, a position detection device 13, a communication device 14, a notification device 15, and a driving assistance device 16.

The driving operation device 12 includes an acceleration operation element 12a, a brake operation element 12b, a steering operation element 12c, and a shift operation element 12d, each of which is disposed in the vicinity of the driver's seat to be accessible by the driver. The acceleration operation element 12a is configured to be capable of receiving, from the driver, an operation input for accelerating or keeping the travel of the vehicle 1, and an accelerator pedal can be used as its typical example. The brake operation element 12b is configured to be capable of receiving, from the driver, an operation input for decelerating or stopping the vehicle 1, and a brake pedal can be used as its typical example. The steering operation element 12c is configured to be capable of receiving, from the driver, an operation input for making a turn or changing the traveling direction the vehicle 1, and a steering wheel can be used as its typical example. The shift operation element 12d is configured to be capable of receiving, from the driver, an operation input for changing a gear ratio of a transmission in a power transmission mechanism that transmits dynamic power from a dynamic power source to the wheels 11, and a shift lever can be used as its typical example. Note that any other known configurations, such as a button switch, may be adopted for each of the operation elements 12a to 12d.

The position detection device 13 is a sensor capable of detecting or identifying position information of the vehicle 1, and a global positioning system (GPS) sensor can be typically used. Note that the position detection device 13 detects the position of the vehicle 1 in absolute coordinates, but may detect a relative position of the vehicle 1 with respect to a reference position.

The communication device 14 is configured to be capable of exchanging signals with other vehicles on so-called vehicle-to-vehicle communication (in order to distinguish from the other vehicles, the vehicle 1 will be referred to as the self-vehicle 1, in some cases, in the following description). Details of communication contents will be described later.

The notification device 15 includes a sound source device 15*a* and a display device 15*b*. The sound source device 15*a* is configured to be capable of generating a predetermined notification sound for the driver, and it is sufficient to use a known device such as a speaker for making the driver recognize audibly. The display device 15*b* is configured to be capable of displaying image information to the driver, and it is sufficient to use a known device for making the driver visually recognize the image information, such as a liquid crystal display. Details of notification contents will be described later.

The driving assistance device 16 includes central processing unit (CPU) 16*a* and a memory 16*b*. The CPU 16*a* executes a predetermined program, while developing the program on the memory 16*b*, and thus realizes a driving assistance function to be described later. The driving assistance device 16 may be configured with an application specific integrated circuit (ASIC). That is, the driving assistance function may be realized by either hardware or software, may be incorporated into a semiconductor device on a circuit, or may be performed on a processor with a memory, based on an instruction of a computer.

(Example of Driving Assistance Function)

The driving assistance performed by the driving assistance device 16 denotes directly or indirectly assisting driver's driving. In the present embodiment, the driving assistance device 16 is capable of making, for example, an interference prediction with respect to another vehicle, based on a communication result by the communication device 14, creating map information as necessary, and giving a predetermined notification by the notification device 15, thereby performing the driving assistance.

Interference Prediction Based on Communication with respect to Oncoming Vehicle

FIG. 2A illustrates an interference prediction with respect to an oncoming vehicle $9_{OB1}$ in one mode, as an example of another vehicle. It is assumed that a vehicle lane, in which the self-vehicle 1 is traveling, is a self-vehicle lane 40, and the oncoming vehicle $9_{OB1}$ is traveling in an opposite lane 41, in which traveling in a direction opposite to the lane 40 is permitted. In addition, in the drawing, lanes 42 and 43, which are opposite lanes to each other, intersect the lanes 40 and 41, and the place of an intersection is indicated as an intersection 44.

Note that in the present example, it is assumed that the lane 41 is located on the left side of the lane 40, but the positional relationship between them is reversed depending on the nation or region (the same reasoning also applies to the lanes 42 and 43).

The self-vehicle 1 causes the communication device 14 to acquire travel information from the oncoming vehicle $9_{OB1}$, causes the driving assistance device 16 to perform predetermined arithmetic processing, based on the travel information, and calculate, for example, a travel route of the oncoming vehicle $9_{OB1}$. Typical examples of the travel information of the oncoming vehicle $9_{OB1}$ include information indicating a position, a vehicle speed, and a steering angle of the oncoming vehicle $9_{OB1}$. However, information indicating an accelerator opening degree, the presence or absence of an input into a direction indicator, or the like may be further included. Alternatively, information indicating the travel route itself of the oncoming vehicle $9_{OB1}$ that can be identified by the oncoming vehicle $9_{OB1}$ may be partially or entirely acquired by the communication device 14.

The driving assistance device 16 further receives position information of the self-vehicle 1 from the position detection device 13, also receives information indicating the content of an operation input of the driver into the driving operation device 12 from the driving operation device 12, and calculates a travel route of the self-vehicle 1, based on these pieces of information.

The driving assistance device 16 makes the interference prediction with respect to the oncoming vehicle $9_{OB1}$, based on the travel route of the oncoming vehicle $9_{OB1}$ and the travel route of the self-vehicle 1 that have been acquired in this manner. This prediction is made by calculating a timing when the self-vehicle 1 interferes with the oncoming vehicle $9_{OB1}$, and determining whether such a timing falls within a predetermined period of time from a current timing, for example, whether a time to collision (TTC), which is a period of time until both vehicles come in contact with each other, is smaller than a reference value, when both vehicles maintain their vehicle speeds. As another example, the prediction may be made, based on any other known arithmetic processing model.

In the present embodiment, it is determined that the self-vehicle 1 will interfere with the oncoming vehicle $9_{OB1}$, in a case where the TTC between the self-vehicle 1 and the oncoming vehicle $9_{OB1}$ is smaller than the reference value. When it is determined that the self-vehicle 1 will interfere with the oncoming vehicle $9_{OB1}$, the driving assistance device 16 generates a signal indicating that there is a possibility of the interference, and outputs the signal as a notification signal to the notification device 15. The notification signal here includes a sound source signal Sig15*a* notification of which is to be given by the sound source device 15*a* and an image signal Sig15*b* notification of which is to be given by the display device 15*b*. The sound source device 15*a* generates a predetermined sound based on the sound source signal Sig15*a*, and the display device 15*b* outputs a predetermined image based on the image signal Sig15*b*, thereby enabling the driver to recognize the possibility of the interference.

The above-described interference prediction is mainly made by the arithmetic processing on the CPU 16*a* in the driving assistance device 16, and the presence or absence of the possibility is determined, identified, or calculated, regardless of its magnitude. Therefore, the above-described prediction may be rephrased as determination, identification, or calculation (the same reasoning also applies to another prediction to be described later).

Generation of Map Information Based on Communication With Oncoming Vehicle

In a case where the self-vehicle 1 does not include map data (for example, a case where the map data is not stored in the memory 16*b* of the driving assistance device 16, or a case where the map data is not stored in another storage device), other information to be substituted for the map data can be generated and registered in association with the interference prediction with respect to the above-described oncoming vehicle $9_{OB1}$. The other information that can be generated will be referred to as generated map information in the following description.

The generated map information is mainly generated to indicate the position of the intersection 44, and the position of the intersection 44 is associated with a cross point between another vehicle traveled trajectory that is a trajectory that the oncoming vehicle $9_{OB1}$ has passed and a self-vehicle traveled trajectory that is a trajectory that the self-vehicle 1 has passed after that.

Figure 2B:
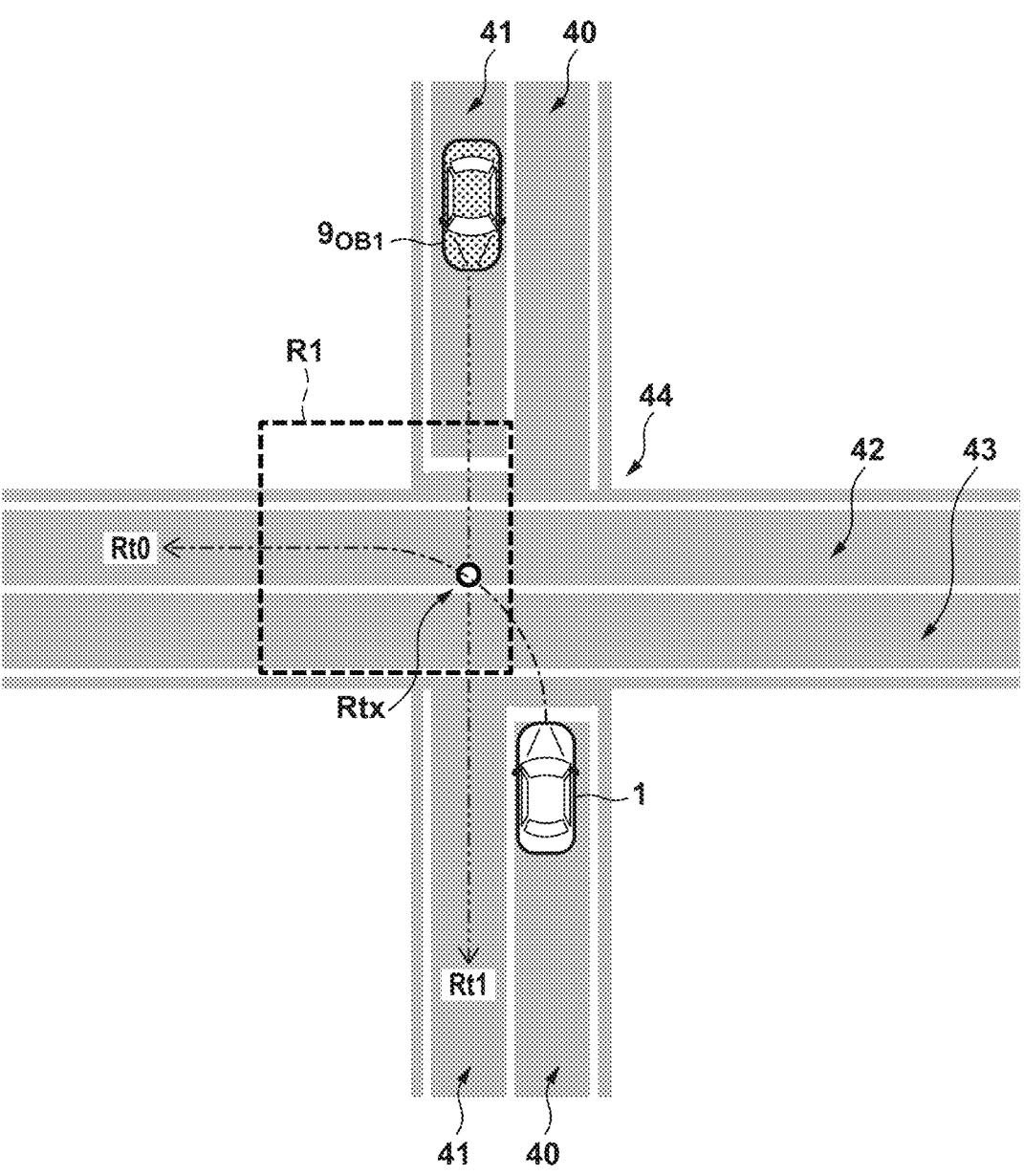
FIG. 2B is a diagram for describing the driving assistance in one mode.

FIG. 2B illustrates, as an example, a situation in which after the oncoming vehicle $9_{OB1}$ passes on a lateral side of the self-vehicle 1, the self-vehicle 1 starts moving and turns to the left. In a case where traveling of the self-vehicle 1 is suppressed (for example, when the self-vehicle 1 substantially stops, or when the self-vehicle 1 is capable of promptly stopping (for example, when the speed is equal to or lower than 20 km/h), the driving assistance device 16 sets a setting region R1 on a forward lateral side of the self-vehicle 1. The setting region R1 is set to a predetermined relative position based on the position information of the self-vehicle 1 that has been acquired by the position detection device 13, and may be set to, for example, a position at a predetermined angle and a predetermined distance from the vehicle body of the self-vehicle 1. When the suppression of traveling of the self-vehicle 1 is released, the setting region R1 is also released. When the traveling of the self-vehicle 1 is suppressed again, the setting region R1 can be set again to a corresponding position at such a timing.

When the oncoming vehicle $9_{OB1}$ passes through the setting region R1, the setting region R1 is fixed. After the oncoming vehicle $9_{OB1}$ passes through, also when the suppression of traveling of the self-vehicle 1 is released, the setting region R1 that has been fixed is maintained. Then, when the self-vehicle 1 turns to the left and passes through the setting region R1, which has been fixed, a cross point RtX between another vehicle traveled trajectory Rt1, which is a trajectory of the oncoming vehicle $9_{OB1}$, and a self-vehicle traveled trajectory Rt0, which is a trajectory of the self-vehicle 1, is exhibited. The position information of the cross point RtX can be stored and registered, as generated map information indicating the position of the intersection 44, in the memory 16_b_.

Note that the above setting region R1, which has been fixed, can be released in response to registration of the generated map information, and/or can be released in response to the self-vehicle 1 being separated from the setting region R1 by equal to or more than a reference.

The driving assistance device 16 is capable of optionally referring to the generated map information that has been acquired in this manner, thus identifying the position of the intersection 44, even though the self-vehicle 1 does not include the map data, generating the above-described notification signal as necessary, and attracting a driver's attention. The generated map information may be referred to as intersection position information. In addition, in a case where the suppression of traveling of the self-vehicle 1 is released also during such arithmetic processing, the interference prediction with respect to the oncoming vehicle $9_{OB1}$ is appropriately made, as having been described with reference to FIG. 2A.

Interference Prediction Based on Communication With Forward Crossing Vehicle

Figure 3A:
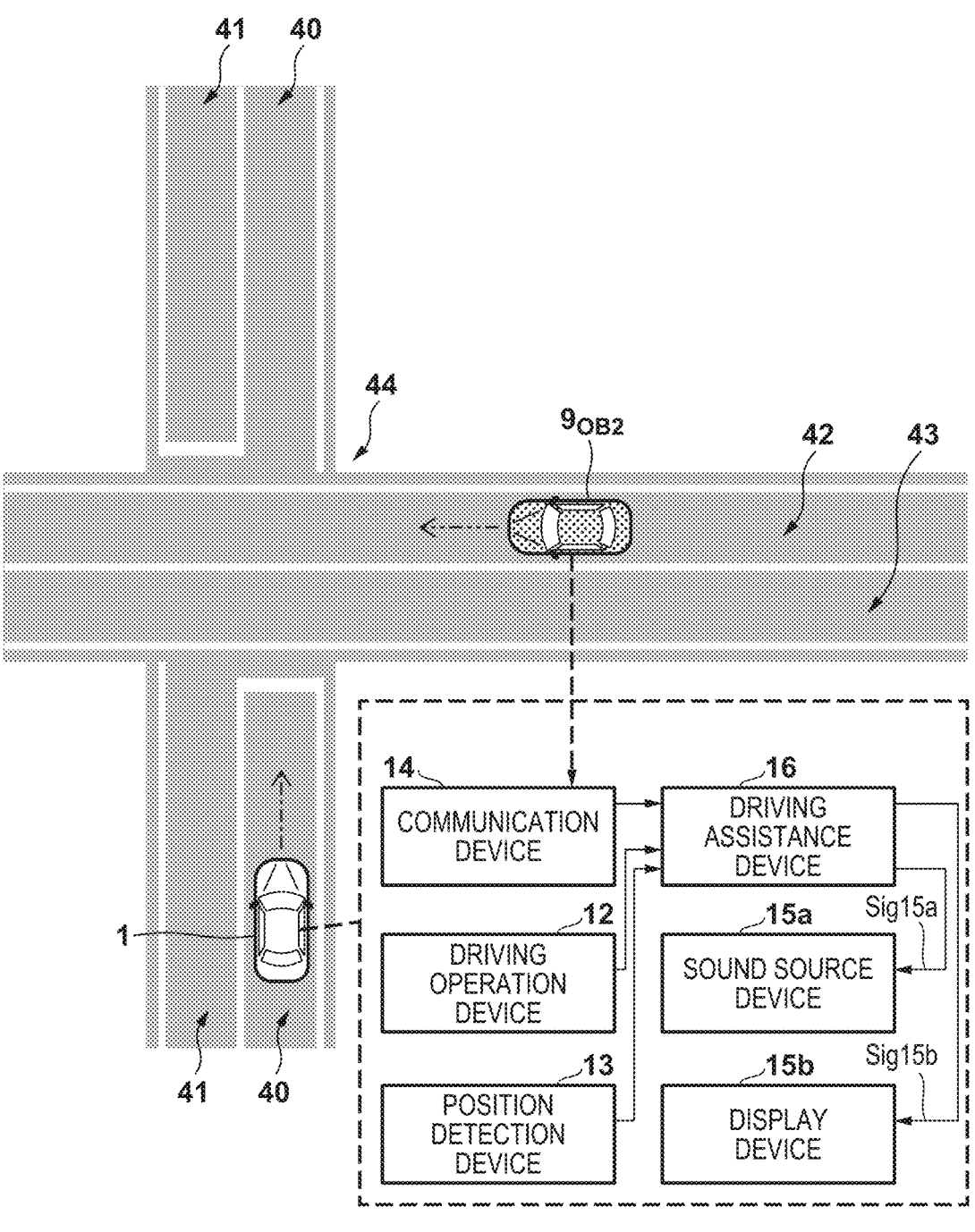
FIG. 3A is a diagram for describing the driving assistance in one mode.

FIG. 3A illustrates an interference prediction with respect to a forward crossing vehicle $9_{OB2}$ in one mode, as another example of another vehicle. It is assumed that the forward crossing vehicle $9_{OB2}$ is traveling in the lane 42. Also in the present example, the interference prediction can be made similarly to the example of FIG. 2A. That is, the driving assistance device 16 calculates a travel route of the forward crossing vehicle $9_{OB2}$, based on the travel information of the forward crossing vehicle $9_{OB2}$ that has been acquired by the communication device 14, and calculates a travel route of the self-vehicle 1, based on the acquired information from the position detection device 13 and the driving operation device 12.

The driving assistance device 16 makes the interference prediction with respect to the forward crossing vehicle $9_{OB2}$, based on the travel route of the forward crossing vehicle $9_{OB2}$ and the travel route of the self-vehicle 1 that have been acquired in this manner. In a case where the TTC between the self-vehicle 1 and the forward crossing vehicle $9_{OB2}$ is smaller than the reference value, it is determined that the self-vehicle 1 will interfere with the forward crossing vehicle $9_{OB2}$, and the driving assistance device 16 outputs the above-described notification signal to the notification device 15. This enables the driver to recognize the possibility of the interference.

Figure 3B:
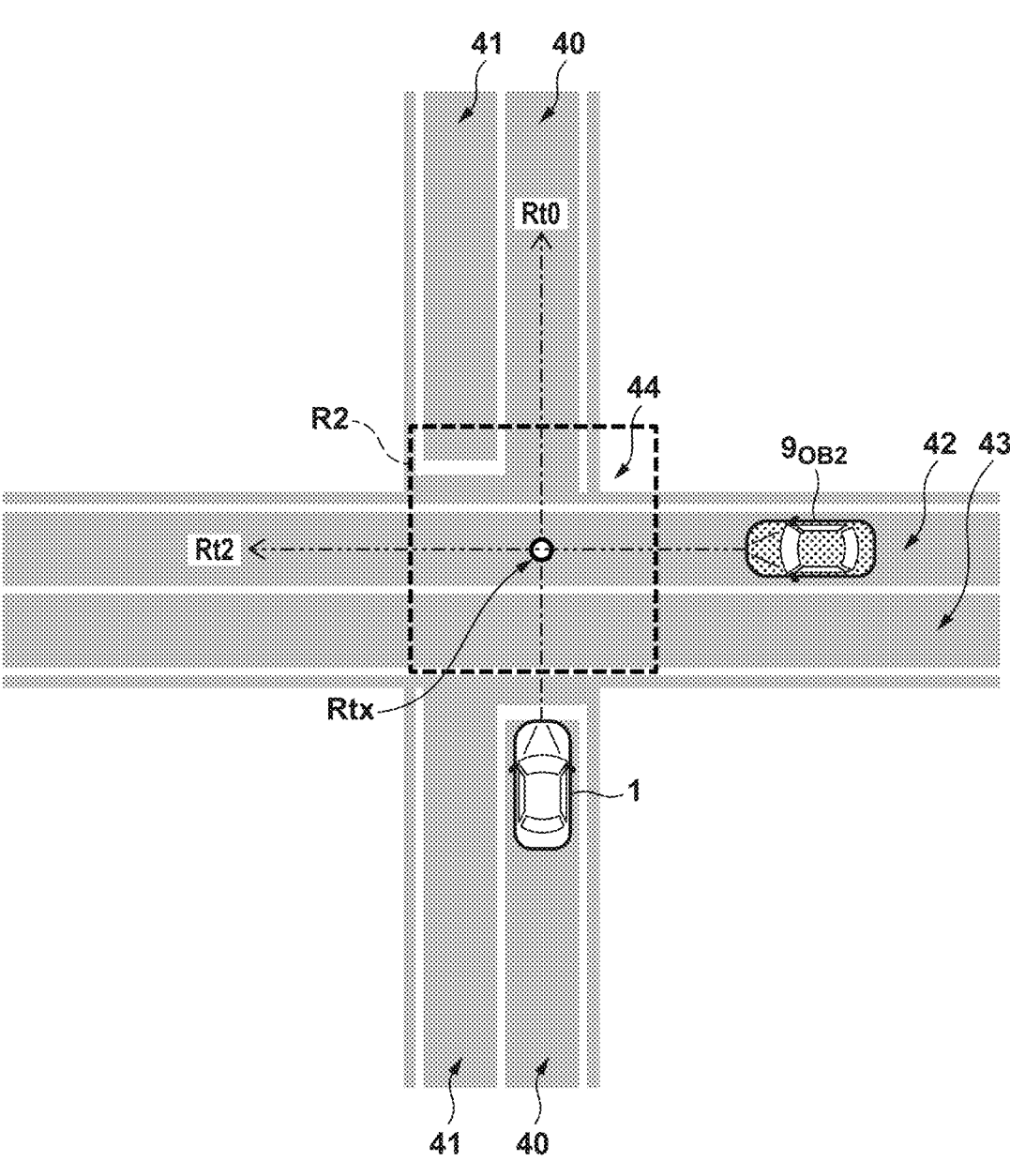
FIG. 3B is a diagram for describing the driving assistance in one mode.

Generation of Map Information Based on Communication With Forward Crossing Vehicle FIG. 3B illustrates, as an example, a situation in which after the forward crossing vehicle $9_{OB2}$ passes on a forward side of the self-vehicle 1, the self-vehicle 1 starts moving and advances straight. In a case where the traveling of the self-vehicle 1 is suppressed, the driving assistance device 16 sets a setting region R2 on a forward side of the self-vehicle 1. The setting region R2 is set independently of the setting region R1. In addition, similarly to the setting region R1, the setting region R2 is also released, when the suppression of traveling of the self-vehicle 1 is released, and the setting region R2 can be set again to a corresponding position, when traveling of the self-vehicle 1 is suppressed again.

When the forward crossing vehicle $9_{OB2}$ passes through the setting region R2, the setting region R2 is fixed. After the forward crossing vehicle $9_{OB2}$ passes through, also when the suppression of traveling of the self-vehicle 1 is released, the setting region R2 that has been fixed is maintained. Then, when the self-vehicle 1 advances straight and passes through the setting region R2, which has been fixed, a cross point RtX between another vehicle traveled trajectory Rt2, which is a trajectory of the forward crossing vehicle $9_{OB2}$, and the self-vehicle traveled trajectory Rt0, which is a trajectory of the self-vehicle 1, is exhibited. The position information of the cross point RtX can be stored and registered, as generated map information indicating the position of the intersection 44, in the memory 16_b_.

Note that the above setting region R2, which has been fixed, can be released in response to registration of the generated map information, and/or can be released in response to the self-vehicle 1 being separated from the setting region R2 by equal to or more than a reference.

The driving assistance device 16 is capable of generating the above-described notification signal, based on the generated map information that has been acquired in this manner, and attracting a driver's attention. In addition, in a case where the suppression of traveling of the self-vehicle 1 is released also during such arithmetic processing, the interference prediction with respect to the forward crossing vehicle $9_{OB2}$ is appropriately made, as having been described with reference to FIG. 3A.

Some types of driving assistance that have been described above may be performed, regardless of the presence or absence of a traffic light at the intersection 44, but can be particularly advantageous for improving convenience, in a case where there is no traffic light.

(Suppression of Unnecessary Driving Assistance)

The above-described driving assistance is partially or entirely unnecessary in some cases, depending on the situation. In such cases, the driving assistance may rather annoy the driver. Therefore, it is conceivable to suppress the driving assistance partially or entirely. On the other hand, it can be also said that the driving assistance should be limited to partial suppression so that an appropriate road traffic environment is achieved to avoid confusion for other vehicles or the like.

As an example, in a case where a shift range of the transmission that can be changed by the shift position of the shift operation element 12d in the vehicle 1 (hereinafter, in order to facilitate the description, referred to as a shift range of the vehicle 1) suppresses a movement of the vehicle 1, it can be generally considered that there is no intention of starting to move the vehicle 1. In such a case, the above-described driving assistance may be suppressed. For example, the arithmetic processing related to the interference prediction with respect to another vehicle can be deactivated, as compared with the other cases.

As illustrated in FIG. 4, for facilitating understanding, in a case where an automatic transmission (AT) vehicle is considered, a typical example of the shift range includes:

Parking (P) range for the vehicle 1 to remain in a stopped state;

Reverse (R) range for the vehicle 1 to be in a state of capable of moving rearward;

Neutral (N) range in which the transmission path of the dynamic power to the wheels 11 is interrupted; and Drive (D) range for the vehicle 1 to be capable of moving forward.

In P range, both a forward movement and a rearward movement of the vehicle 1 are suppressed, regardless of an operation input into the acceleration operation element 12a. Therefore, it can be said that P range is a shift range for suppressing the movement of the vehicle 1 (the movement is a concept including the forward movement and the rearward movement).

In R range, the forward movement of the vehicle 1 is suppressed, whereas the vehicle 1 moves rearward in response to an operation input into the acceleration operation element 12a, that is, R range suppresses the forward movement of the vehicle 1, and permits the rearward movement. Here, the driving assistance according to the present embodiment can be mainly utilized in a situation in which the vehicle 1 moves forward. Therefore, although details will be described later, it can be said that R range is a shift range for suppressing the movement of the vehicle 1 in one aspect.

In N range, the movement of the vehicle 1 is suppressed, in a case where the road surface is horizontal, but in a case where the road surface is inclined, there is a possibility that the vehicle 1 moves along the direction of such an inclination. Therefore, it can be said that N range is a shift range that does not actively permit the movement of the vehicle 1, but does not suppress the movement of the vehicle 1.

In D range, the vehicle 1 moves forward in response to an operation input into the acceleration operation element 12a. Therefore, it can be said that D range is a shift range that permits the movement of the vehicle 1.

Note that examples of additional other shift ranges include a sport range (S range) or a second range (2 ranges) in which the engine brake is utilized, and a brake range (B range) or a low range (L range) in which the engine brake is further utilized. These are all shift ranges that permit the movement of the vehicle 1, and are included in the concept of D range in order to facilitate the description.

According to the above viewpoint, in the case of P range, it can be generally considered that there is no intention of starting to move the vehicle 1. In such a case, it is unlikely that the vehicle 1 gets closer to and interferes with another vehicle (or another object) in response to the driver's driving operation, and the notification that has been described with reference to the examples of FIGS. 2A to 3B may unnecessarily attract the driver's attention. Therefore, the generation of the above-described notification signal is suppressed. The suppression of the generation of the notification signal includes partial suppression, that is, out of the sound source signal Sig15a and the image signal Sig15b, the sound source signal Sig15a may be suppressed, and the image signal Sig15b may be generated. As another example, in such a case, making the interference prediction itself may be suppressed, and then, generation of both the sound source signal Sig15a and the image signal Sig15b is suppressed.

As described above, the driving assistance according to the present embodiment can be mainly utilized in a situation in which the vehicle 1 moves forward. Therefore, also in the case of R range, the above-described notification may unnecessarily attract the driver's attention. For this reason, also in the case of R range, the generation of the notification signal or making of the interference prediction itself may be suppressed in a similar manner to P range.

On the other hand, in the case of N range, it cannot be said that there is no intention of starting to move the vehicle 1. In addition, in the case of D range, it can be said that there is an intention of starting to move the vehicle 1. In those cases, the interference prediction with respect to another vehicle is appropriately made, and the notification signal can be generated, as necessary.

To summarize, in a case where the shift range suppresses the movement of the vehicle 1, the driving assistance according to the present embodiment may annoy the driver of the vehicle 1. For this reason, in such a case, the generation of the notification signal or making the interference prediction itself is suppressed, and the arithmetic processing related to the interference prediction with respect to another vehicle can be at least partially deactivated.

Note that typical scenes in which the above situation is assumed include a scene in which the vehicle 1 is in a stopped state in P range on a road shoulder of the lane 40, a scene in which the vehicle 1 in P range waits for a traffic signal in the lane 40, and the like.

(Exceptional Measures for Suppression of Driving Assistance)

Incidentally, as described above, it can be said that the suppression of the driving assistance according to the present embodiment should be limited to partial suppression so that an appropriate road traffic environment is achieved.

First Example

Figure 5:
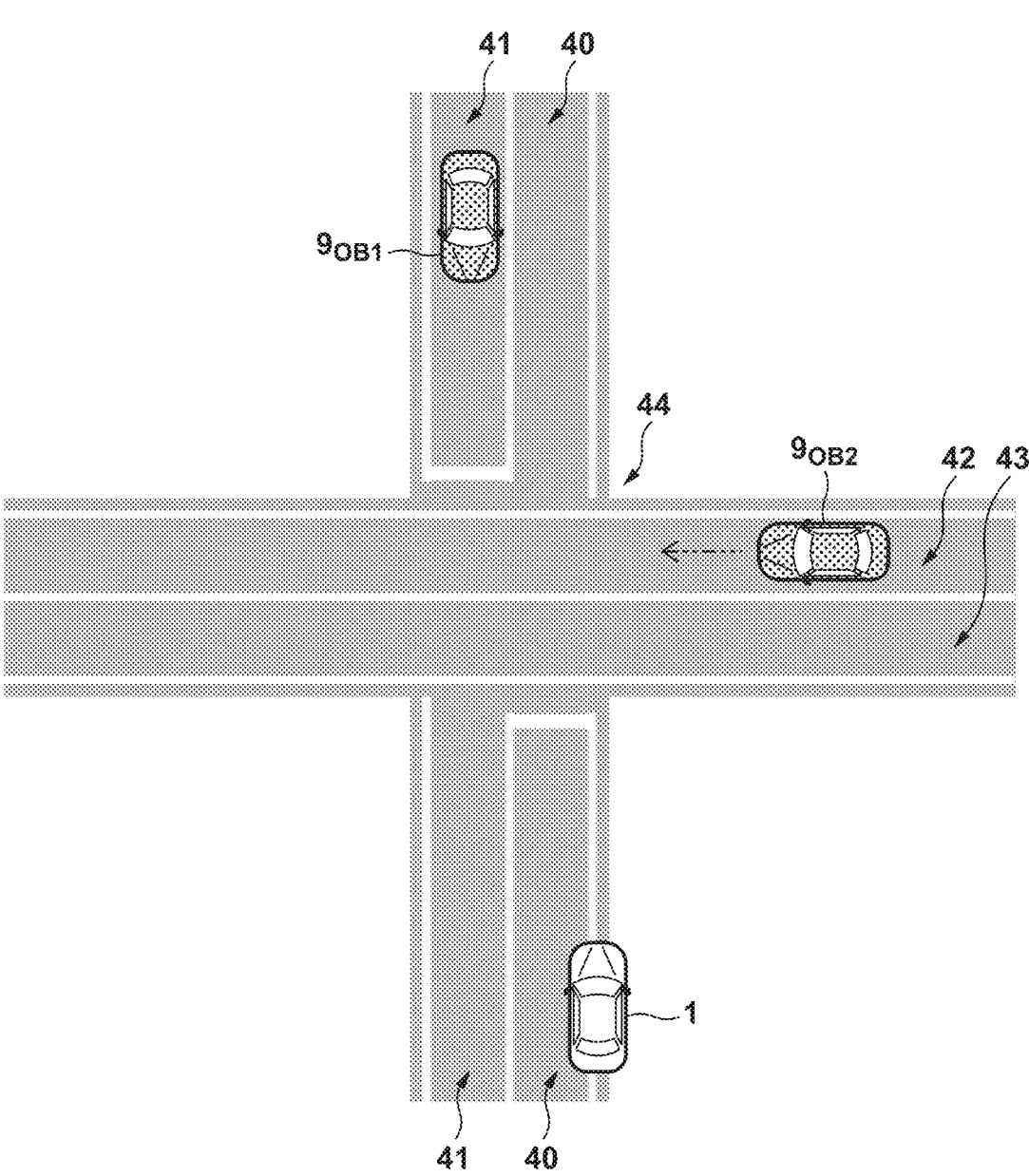
FIG. 5 is a diagram for describing the driving assistance in one mode.

FIG. 5 illustrates a state in which the vehicle 1 is in a stopped state in P range in the vicinity of the intersection 44. In general, in the vicinity of the intersection 44, it may be necessary for the driver of the vehicle 1 to pay attention in various manners, in addition to paying attention to other vehicles including the oncoming vehicle $9_{OB1}$ and the forward crossing vehicle $9_{OB2}$. Therefore, in such an example, the driving assistance according to the present embodiment may be performed, regardless of the shift range (for example, even in P range or R range).

The vicinity of the intersection 44 mentioned here is an area in which it is necessary to pay attention to a wider range or to pay attention from multiple viewpoints. For example, such an area is an area in which it is necessary to pay attention to not only a forward side of the vehicle 1 but also left and right sides, and its size can be determined by a fixed value (for example, 10 to 20 meters). The intersection 44 can be identified in the procedure that has been described with reference to FIGS. 2B and 3B. In a case where the generated map information is registered by the same procedure, it can be identified, based on the generated map information.

To summarize, in a case where the position of the intersection 44 that has been identified beforehand is present within a range of a predetermined distance (for example, within 10 to 20 meters) from the vehicle 1, the interference prediction is made, regardless of the shift range, that is, the arithmetic processing related to the interference prediction with respect to another vehicle is not deactivated.

Second Example

When the vehicle 1 in the stopped state in P range is made to start moving, the driver generally changes the shift range to, for example, D range, and then inputs a certain operation into the acceleration operation element 12a. Therefore, with the fact that such a shift change is made, it cannot be immediately said that there is an intention of starting to move the vehicle 1, that is, it is unlikely that the vehicle 1 immediately gets closer to and interferes with another vehicle due to the shift change. Therefore, in the present example, it is assumed that in a case where the traveling state of the vehicle 1 satisfies a condition within a predetermined period of time after the shift is changed from P range to D range, the above-described driving assistance is performed and the interference prediction is made.

The condition of the traveling state of the vehicle 1 mentioned here may be any condition with which it is generally possible to determine that there is an intention of starting to move the vehicle 1. Typical examples may include the vehicle speed of the vehicle 1 becoming equal to or higher than a reference (for example, 20 kilometers per hour). As another example, alternatively or additionally, the condition that the accelerator opening degree of the vehicle 1 is equal to or larger than a reference may be set.

In addition, it is sufficient to set the predetermined period of time mentioned here to a period of time that is generally necessary for the driver from the time when the driver changes the shift to start moving the vehicle 1 in the stopped state to the time when the driver makes an operation input into the acceleration operation element 12a. For example, any value within a range of one to ten seconds can be set.

In the present example, the case where the shift range is changed from P range to D range has been exemplified. However, it can be considered that the above configuration is necessary not only when the vehicle 1 moves forward but also when the vehicle 1 moves rearward. Therefore, the above configuration is also applicable to a case where the shift range is changed from P range to R range (the same reasoning also applies in the following description). Therefore, to summarize, it is sufficient to make the interference prediction, based on the traveling state of the vehicle 1 within a predetermined period of time after the shift range of the vehicle 1 is changed from the range that suppresses the movement (for example, P range) to the rage that permits the movement (for example, D range or R range).
(Control Contents of Driving Assistance)

FIG. 6 is a flowchart illustrating control contents of the driving assistance device 16 when performing driving assistance according to the present embodiment. The present flowchart is assumed to start, for example, in response to start-up of the vehicle 1, and the content of each step can be achieved by the CPU 16a mainly executing a program.

In step S6010 (hereinafter, simply referred to as "S6010". The same description applies to the other steps to be described later), it is determined whether the position of the intersection 44 is present within a range of a predetermined distance from the vehicle 1. In a case where the position of the intersection 44 is present within the range of the predetermined distance from the vehicle 1, the processing proceeds to S6130, and in the other cases, the processing proceeds to S6020.

In S6020, the shift range of the vehicle 1 is identified, and it is determined whether the shift range is P range. In the case of P range, the processing proceeds to S6030, and in the other cases (here, in a case of D range), the processing proceeds to S6110. The shift range can be identified by acquiring a signal indicating the shift position of the shift operation element 12d from the driving operation device 12.

In S6030, the operation mode of the driving assistance is set to an inactive mode, and then the processing returns to S6010. By setting the inactive mode, the arithmetic processing related to interference prediction with respect to another vehicle is deactivated, and generation of the above-described notification signal or making of the interference prediction itself is suppressed. Note that this step may be omitted, in a case where the inactive mode is already set or in a case where the inactive mode is set as an initial state.

In S6110, it is determined whether an elapsed time from the identification that the shift range is changed to D range satisfies a reference (for example, any value that can be determined from a range of one to ten seconds). In a case where the elapsed time satisfies the reference, the processing proceeds to S6120, and in the other cases, the processing returns to S6010.

In S6120, it is determined whether the traveling state of the vehicle 1 satisfies a condition, and in the present example, it is determined whether the vehicle speed of the vehicle 1 satisfies a reference (for example, 20 km/h or the like). In a case where the vehicle speed satisfies the reference, the processing proceeds to S6130, and in the other cases, the processing returns to S6010. That is, S6010, S6020, S6110, and S6120 are repeated until the vehicle speed of the vehicle 1 satisfies the reference, after the shift range is changed to D range. Note that in the meantime, when the shift range is changed to P range again, S6010, S6020, and S6030 are repeated.

In S6130, the operation mode of the driving assistance is set to an active mode, and then the processing returns to S6010. For example, in a case where it is determined in S6010 that the position of the intersection 44 is present within the range of the predetermined distance from the vehicle 1, the active mode is set assuming that it is necessary to pay various kinds of attention. In addition, for example, in a case where it is determined that the vehicle speed of the vehicle 1 in D range satisfies the reference in S6110 and S6120, the active mode is set assuming that there is an intention of starting to move the vehicle 1. By setting the active mode, the arithmetic processing related to the interference prediction with respect to another vehicle is activated, thus the interference prediction is made, and a notification signal is generated, as necessary.

In the above-described second example, an example has been given in one mode in which the interference prediction is made, based on the traveling state of the vehicle 1 within the predetermined period of time after the shift range is changed from P range to D range. However, when another vehicle including the oncoming vehicle 9$_{OB1}$ (see FIG. 2A) or the forward crossing vehicle 9$_{OB2}$ (see FIG. 3A) is detected in the surroundings of the self-vehicle 1, it can be necessary to pay attention to another such vehicle, without waiting for the traveling state of the vehicle 1 to satisfy the condition (in the second example, the vehicle speed satisfies the reference).

Therefore, in such a case, the operation mode of the driving assistance may be promptly set to the active mode. Referring to the flowchart of FIG. 6 again, this can be relatively easily achieved by omitting S6110 and S6120 by interrupt processing based on detection of the presence of another vehicle by the communication device 14, for example.

Note that the case where the forward crossing vehicle $9_{OB2}$ is detected can be considered that the self-vehicle 1 is located in the vicinity of the intersection 44. Therefore, in a case where the intersection 44 is identified, the driving assistance based on the above-described first example can be performed on a priority basis (see FIG. 5).

Heretofore, according to the present embodiment, the driving assistance device 16 calculates the travel route of another vehicle (the oncoming vehicle $9_{OB1}$ and/or the forward crossing vehicle $9_{OB2}$), based on the communication result with another such vehicle by the communication device 14, and determines whether the self-vehicle 1 will interfere with another such vehicle. When it is determined that the self-vehicle 1 will interfere with another such vehicle, a predetermined notification signal is generated and output to the notification device 15. On the other hand, in a case where the shift range of the vehicle 1 suppresses its movement, it can be generally said that there is no intention of starting to move the vehicle 1, and thus, the arithmetic processing including making the above determination and generating the notification signal is deactivated. This enables provision of more comfortable driving assistance for the driver, without giving an unnecessary notification to the driver. Therefore, according to the present embodiment, it can be said that it is advantageous for improving the preventive safety technology that can be utilized for the driving assistance.

Another vehicle may be detected by the self-vehicle 1 communicating with another vehicle by the communication device 14, but may alternatively or additionally be detected by a detection device that is capable of detecting an object in the surroundings of the self-vehicle 1 and that is provided in the vehicle 1. As the detection device, a camera including a CCD/CMOS image sensor or the like may be used, but a distance measuring device such as a millimeter wave radar or a light detection and ranging (LiDAR) may be used.

In a case where the vehicle 1 further includes the above detection device, the driving assistance device 16 is capable of performing further driving assistance in combination with the communication device 14. For example, the self-vehicle 1 is capable of communicating, by the communication device 14, with another vehicle outside the detection range (or a dead angle location of the detection range) of the above detection device. Therefore, according to an embodiment, it is advantageous for promptly achieving appropriate driving assistance, diversifying the contents of the driving assistance, and providing more advanced driving assistance, accordingly.

In the description heretofore, to facilitate understanding, each element is indicated by a name related to its functional aspect. However, each element is not limitedly interpreted as an element including the content described in the embodiments as a main function but may be an element including the content as a supplementary function. Thus, each element may be replaced with a similar expression without being strictly limited by its expression. For the same purpose, the expression "apparatus" may be replaced with "unit", "part (component, piece)", "member", "structure", "assembly" or the like, or may be omitted or attached.

In addition, two or more elements selectively illustrated in the embodiments are not strictly limited to its illustration, and may be optionally combined. For example, each of the two or more elements illustrated in the examples may be additionally or alternatively selected. As an example, when two elements A and B are optionally combined, it may be expressed as "A and/or B" or may be expressed as "at least one of A and B" as indicating any of only A, only B, and both A and B.

Summary of Embodiments

Some characteristics illustrated in the above embodiments are as follows:

In the first aspect, a driving assistance device (16), which is to be mounted on a vehicle (1) capable of communicating with another vehicle ($9_{OB1}$, $9_{OB2}$), comprises:

a calculation unit (16a, FIGS. 2A to 3B) configured to calculate a travel route of the another vehicle, based on a communication result with the another vehicle;

an arithmetic processing unit (16a, S6130) configured to determine whether the self-vehicle will interfere with the another vehicle traveling on the travel route calculated, and to generate a notification signal (Sig15a, Sig15b) for giving a notification that the self-vehicle will interfere with the another vehicle, upon determination that the self-vehicle will interfere with the another vehicle; and an identification unit (16a, S6020) configured to identify a state of a shift range of the self-vehicle, wherein in a case where the shift range identified by the identification unit suppresses a movement of the self-vehicle, the arithmetic processing unit is deactivated (16a, S6030).

This enables provision of more comfortable driving assistance for the driver, without giving an unnecessary notification to the driver, and it is advantageous in improving the preventive safety technology that can be utilized for the driving assistance.

In the second aspect, in a case where the shift range identified by the identification unit suppresses the movement of the self-vehicle, the arithmetic processing unit suppresses generation of the notification signal based on the determination.

This enables suppression of an unnecessary notification to the driver.

In the third aspect, the arithmetic processing unit generates the notification signal based on the determination, based on a traveling state of the self-vehicle after a shift range of the self-vehicle is changed from a shift range that suppresses the movement of the self-vehicle to a shift range that permits the movement of the self-vehicle.

This enables consideration of an intention of starting to move the self-vehicle appropriately.

In the fourth aspect, the shift range that permits the movement includes a D range and an R range.

This enables provision of the driving assistance to correspond to both the forward movement and the rearward movement of the self-vehicle.

In the fifth aspect, the traveling state of the self-vehicle includes a vehicle speed of the self-vehicle, and in a case where the vehicle speed of the self-vehicle is equal to or higher than a reference, the arithmetic processing unit generates the notification signal based on the determination.

This enables consideration of an intention of starting to move the self-vehicle appropriately.

In the sixth aspect, the traveling state of the self-vehicle includes an accelerator opening degree of the self-vehicle, and in a case where the accelerator opening degree of the self-vehicle is equal to or larger than a reference, the arithmetic processing unit generates the notification signal based on the determination.

This enables consideration of an intention of starting to move the self-vehicle appropriately.

In the seventh aspect, in a case where a position of an intersection (44) identified beforehand is present within a range of a predetermined distance from the self-vehicle, the arithmetic processing unit generates the notification signal based on the determination, regardless of the shift range identified by the identification unit.

This enables provision of more appropriate driving assistance.

In the eighth aspect, in a case where the shift range of the self-vehicle is changed from the shift range that suppresses the movement of the self-vehicle to the shift range that permits the movement of the self-vehicle, the arithmetic processing unit generates the notification signal based on the determination, and in a case where an oncoming vehicle is present as the another vehicle on a forward side of the self-vehicle, the arithmetic processing unit generates the notification signal based on the determination, based on the traveling state of the self-vehicle.

This enables provision of more appropriate driving assistance.

In the ninth aspect, the calculation unit further calculates a travel route of the self-vehicle, based on the shift range identified by the identification unit, and the arithmetic processing unit generates the notification signal based on the determination, based on the travel route of the self-vehicle and the travel route of the another vehicle.

This enables provision of more appropriate driving assistance, in a case where an intention of starting to move the self-vehicle is taken into consideration.

In the tenth aspect, in a case where the shift range identified by the identification unit is an R range, the arithmetic processing unit generates the notification signal based on the determination.

That is, from the viewpoint that the driving assistance is mainly utilized in a situation in which the vehicle moves forward, it can be said that R range, which suppresses the forward movement of the vehicle, but which permits the rearward movement, is the shift range that suppresses the movement of the vehicle. However, also when the self-vehicle moves rearward, more appropriate driving assistance can be provided.

In the eleventh aspect, a method of driving assistance for a vehicle capable of communicating with another vehicle, comprises:

a step of calculating a travel route of the another vehicle, based on a communication result with the another vehicle;

a step of determining whether the self-vehicle will interfere with the another vehicle traveling on the travel route calculated, and generating a notification signal for giving a notification that the self-vehicle will interfere with the another vehicle, upon determination that the self-vehicle will interfere with the another vehicle; and a step of identifying a state of a shift range of the self-vehicle, wherein in a case where the shift range identified suppresses a movement of the self-vehicle, the step of determining is performed, and the step of generating the notification signal is deactivated.

Accordingly, the same effect as that in the first effect is obtainable.

In the twelfth aspect, a computer-readable non-volatile storage medium stores a program for causing a computer to be capable of reading a program that performs driving assistance for a vehicle capable of communicating with another vehicle, the program causing the computer to:

calculate a travel route of the another vehicle, based on a communication result with the another vehicle;

determine whether the self-vehicle will interfere with the another vehicle traveling on the travel route calculated, and generate a notification signal for giving a notification that the self-vehicle will interfere with the another vehicle, upon determination that the self-vehicle will interfere with the another vehicle; and identify a state of a shift range of the self-vehicle, wherein in a case where the shift range identified suppresses a movement of the self-vehicle, determining is performed and generating the notification signal is deactivated.

Accordingly, the same effect as that in the first effect is obtainable. The program can be stored in a computer-readable storage medium.

The invention is not limited to the foregoing embodiments, and various variations/changes are possible within the spirit of the invention.

What is claimed is:

1. A driving assistance device to be mounted on a vehicle capable of communicating with another vehicle, the driving assistance device comprising:

a calculation unit configured to calculate a travel route of the another vehicle, based on a communication result with the another vehicle;

an arithmetic processing unit configured to determine whether the self-vehicle will interfere with the another vehicle traveling on the travel route calculated, and to generate a notification signal for giving a notification that the self-vehicle will interfere with the another vehicle, upon determination that the self-vehicle will interfere with the another vehicle; and an identification unit configured to identify a state of a shift range of the self-vehicle, wherein in a case where the shift range identified by the identification unit suppresses a movement of the self-vehicle, the arithmetic processing unit is deactivated.

2. The driving assistance device according to claim 1, wherein in a case where the shift range identified by the identification unit suppresses the movement of the self-vehicle, the arithmetic processing unit suppresses generation of the notification signal based on the determination.

3. The driving assistance device according to claim 2, wherein the arithmetic processing unit generates the notification signal based on the determination, based on a traveling state of the self-vehicle after a shift range of the self-vehicle is changed from a shift range that suppresses the movement of the self-vehicle to a shift range that permits the movement of the self-vehicle.

4. The driving assistance device according to claim 3, wherein the shift range that permits the movement includes a D range and an R range.

5. The driving assistance device according to claim 3, wherein the traveling state of the self-vehicle includes a vehicle speed of the self-vehicle, and in a case where the vehicle speed of the self-vehicle is equal to or higher than a reference, the arithmetic processing unit generates the notification signal based on the determination.

6. The driving assistance device according to claim 3, wherein the traveling state of the self-vehicle includes an accelerator opening degree of the self-vehicle, and in a case where the accelerator opening degree of the self-vehicle is equal to or larger than a reference, the arithmetic processing unit generates the notification signal based on the determination.

7. The driving assistance device according to claim 3, wherein in a case where a position of an intersection identified beforehand is present within a range of a predetermined distance from the self-vehicle, the arithmetic processing unit generates the notification signal based on the determination, regardless of the shift range identified by the identification unit.

8. The driving assistance device according to claim 3, wherein in a case where the shift range of the self-vehicle is changed from the shift range that suppresses the movement of the self-vehicle to the shift range that permits the movement of the self-vehicle, the arithmetic processing unit generates the notification signal based on the determination, and in a case where an oncoming vehicle is present as the another vehicle on a forward side of the self-vehicle, the arithmetic processing unit generates the notification signal based on the determination, based on the traveling state of the self-vehicle.

9. The driving assistance device according to claim 3, wherein the calculation unit further calculates a travel route of the self-vehicle, based on the shift range identified by the identification unit, and

the arithmetic processing unit generates the notification signal based on the determination, based on the travel route of the self-vehicle and the travel route of the another vehicle.

10. The driving assistance device according to claim 1, wherein in a case where the shift range identified by the identification unit is an R range, the arithmetic processing unit generates the notification signal based on the determination.

11. A method of driving assistance for a vehicle capable of communicating with another vehicle, the method comprising:

a step of calculating a travel route of the another vehicle, based on a communication result with the another vehicle;

a step of determining whether the self-vehicle will interfere with the another vehicle traveling on the travel route calculated, and generating a notification signal for giving a notification that the self-vehicle will interfere with the another vehicle, upon determination that the self-vehicle will interfere with the another vehicle; and a step of identifying a state of a shift range of the self-vehicle, wherein in a case where the shift range identified suppresses a movement of the self-vehicle, the step of determining is performed, and the step of generating the notification signal is deactivated.

12. A computer-readable non-volatile storage medium storing a program for causing a computer to be capable of reading a program that performs driving assistance for a vehicle capable of communicating with another vehicle, the program causing the computer to:

calculate a travel route of the another vehicle, based on a communication result with the another vehicle;

determine whether the self-vehicle will interfere with the another vehicle traveling on the travel route calculated, and generate a notification signal for giving a notification that the self-vehicle will interfere with the another vehicle, upon determination that the self-vehicle will interfere with the another vehicle; and identify a state of a shift range of the self-vehicle, wherein in a case where the shift range identified suppresses a movement of the self-vehicle, determining is performed and generating the notification signal is deactivated.

* * * * *